United States Patent
Benjamini et al.

(10) Patent No.: US 8,484,143 B2
(45) Date of Patent: Jul. 9, 2013

(54) SYSTEM AND METHOD FOR ANALYZING EXPLORATORY BEHAVIOR

(75) Inventors: Yoav Benjamini, Herzliya (IL); Ilan Golani, Givatayim (IL); Ehud Fonio, Tel-Aviv (IL)

(73) Assignee: Ramot at Tel-Aviv University Ltd., Tel Aviv (IL)

( * ) Notice: Subject to any disclaimer, the term of this patent is extended or adjusted under 35 U.S.C. 154(b) by 292 days.

(21) Appl. No.: 13/119,463

(22) PCT Filed: Sep. 17, 2009

(86) PCT No.: PCT/IL2009/000910
§ 371 (c)(1),
(2), (4) Date: Mar. 17, 2011

(87) PCT Pub. No.: WO2010/032247
PCT Pub. Date: Mar. 25, 2010

(65) Prior Publication Data
US 2011/0173143 A1    Jul. 14, 2011

Related U.S. Application Data

(60) Provisional application No. 61/192,286, filed on Sep. 17, 2008, provisional application No. 61/217,724, filed on Jun. 3, 2009.

(51) Int. Cl.
*G06N 5/00*    (2006.01)
(52) U.S. Cl.
USPC .............................................. 706/12; 706/45

(58) Field of Classification Search
USPC ...................................................... 706/12, 45
See application file for complete search history.

(56) References Cited

PUBLICATIONS

Serhoud, et al., Sliding Mode Control of Brushless Doubly-Fed Machine Used in Wind Energy Conversion System, Revue des Energies Renouvelables, vol. 15 N°2, 2012, pp. 305-320.*
Suárez, et al., Model Predictive Control Strategies for Batch Sugar Crystallization Process, Chapter 11 of Advanced Model Predictive Control, 2011, pp. 225-244.*

* cited by examiner

*Primary Examiner* — Wilbert L Starks
(74) *Attorney, Agent, or Firm* — The Law Office of Michael E. Kondoudis

(57) ABSTRACT

The invention provides a system and method for analyzing a subject's exploratory behavior. The system of the invention includes a tracking device configured to track motion of the subject and to generate a signal indicative of the subject's motion. A CPU analyzes the signal and identifies in the signal sequences of repeated motions, or sequences of sequences of repeated motion, for sequence of repeated motion, the CPU determines for each occurrence of the repeated motion a time at which the occurrence occurred or a time interval during which the occurrence occurred. The CPU then calculates for each occurrence of the repeated motion a value of one or more predetermined parameters of the occurrence of the motion and then calculates a time dependence of the one or more predetermined parameters during the sequence of repeated motion or the sequence of sequences of repeated motion.

30 Claims, 13 Drawing Sheets

| BALB32 | 1 | 2 | 3 | 4 | 5 | 6 | 7 | 8 | 9 | 10 | 11 | 12 |
|---|---|---|---|---|---|---|---|---|---|---|---|---|
| BALB41 | 1 | 2 | 3 | 4 | 5 | 6 | 7 | 8 | 9 | 10 | 11 | 12 |
| BALB43 | 1 | 2 | 3 | 4 | 5 | 6 | 7 | 8 | 9 | 10 | 11 | 12 |
| BALB52 | 1 | 2 | 3 | 4 | 5 | 6 | 7 | 8 | 9 | 10 | 11 | |
| BALB53 | 1 | 2 | 3 | 4 | 5 | 6 | 7 | 8 | 9 | 10 | 11 | 12 |
| BALB42 | 1 | 2 | 3 | 4 | 5 | 7 | 6 | 8 | 9 | 10 | 11 | 12 |
| BALB22 | 1 | 2 | 3 | 6 | 4 | 5 | 7 | 8 | 9 | 10 | 11 | 12 |
| BALB01 | 1 | 2 | 3 | 4 | 5 | 6 | 7 | 9 | 8 | 10 | 11 | 12 |
| BALB33 | 1 | 2 | 3 | 4 | 5 | 6 | 7 | 9 | 8 | 10 | 11 | 12 |
| BALB51 | 1 | 2 | 3 | 4 | 5 | 6 | 9 | 7 | 8 | 10 | 11 | 12 |
| BALB21 | 1 | 2 | 3 | 4 | 5 | 9 | 6 | 7 | 8 | 10 | 11 | 12 |
| BALB31 | 1 | 2 | 3 | 4 | 5 | 9 | 6 | 7 | 8 | 10 | 11 | 12 |

FIG. 4

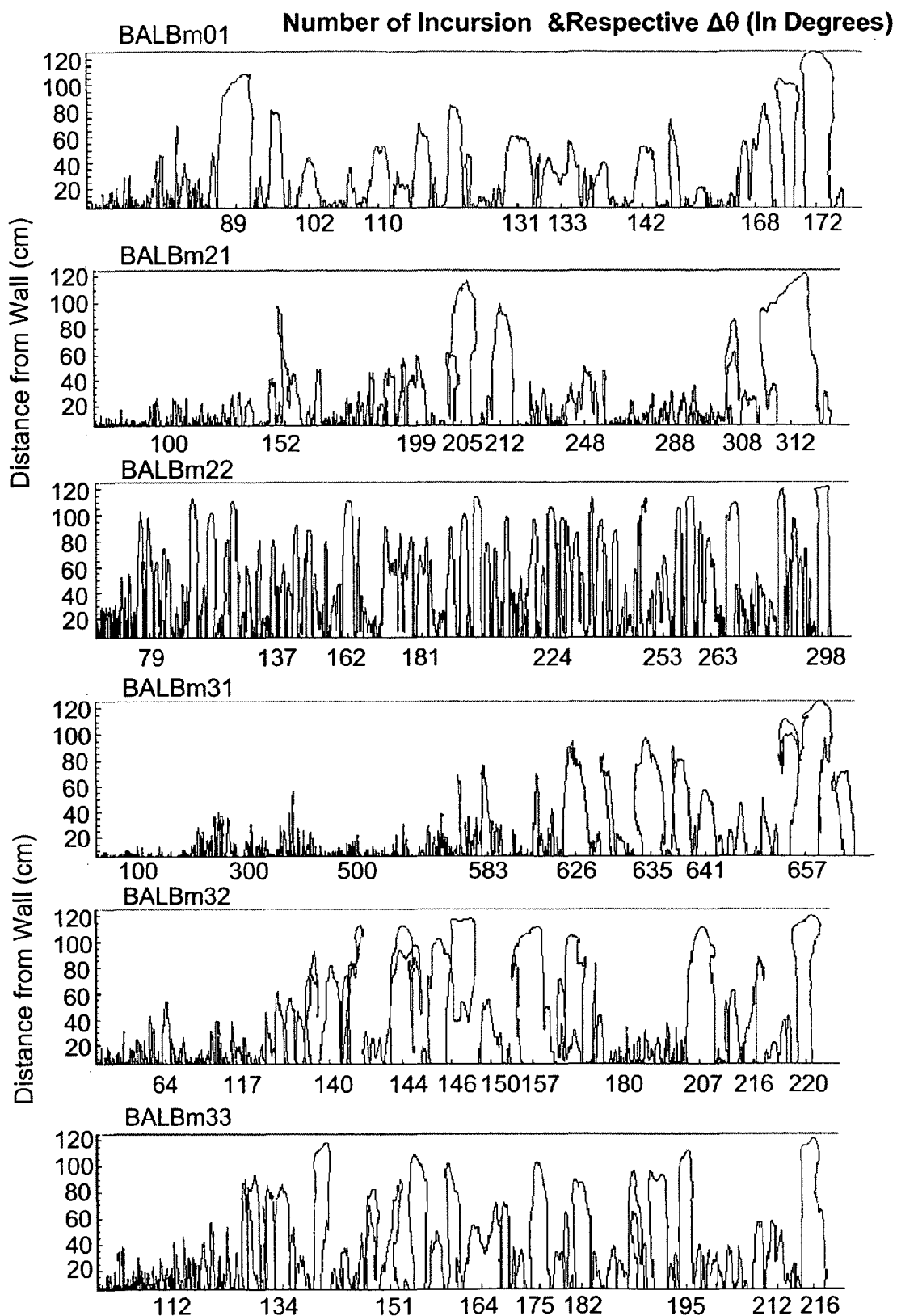
FIG. 7 (Beginning)

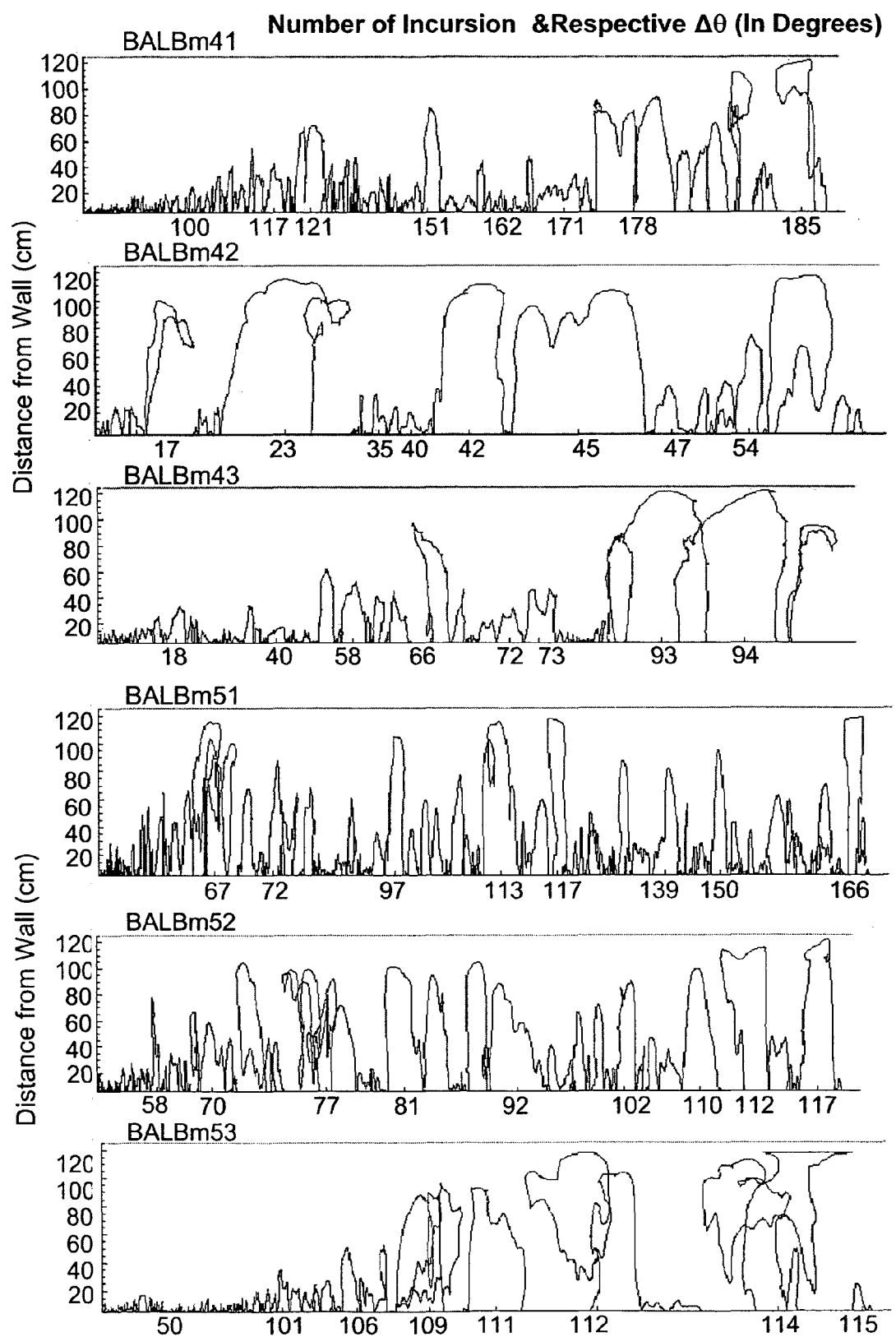
FIG. 7 (End)

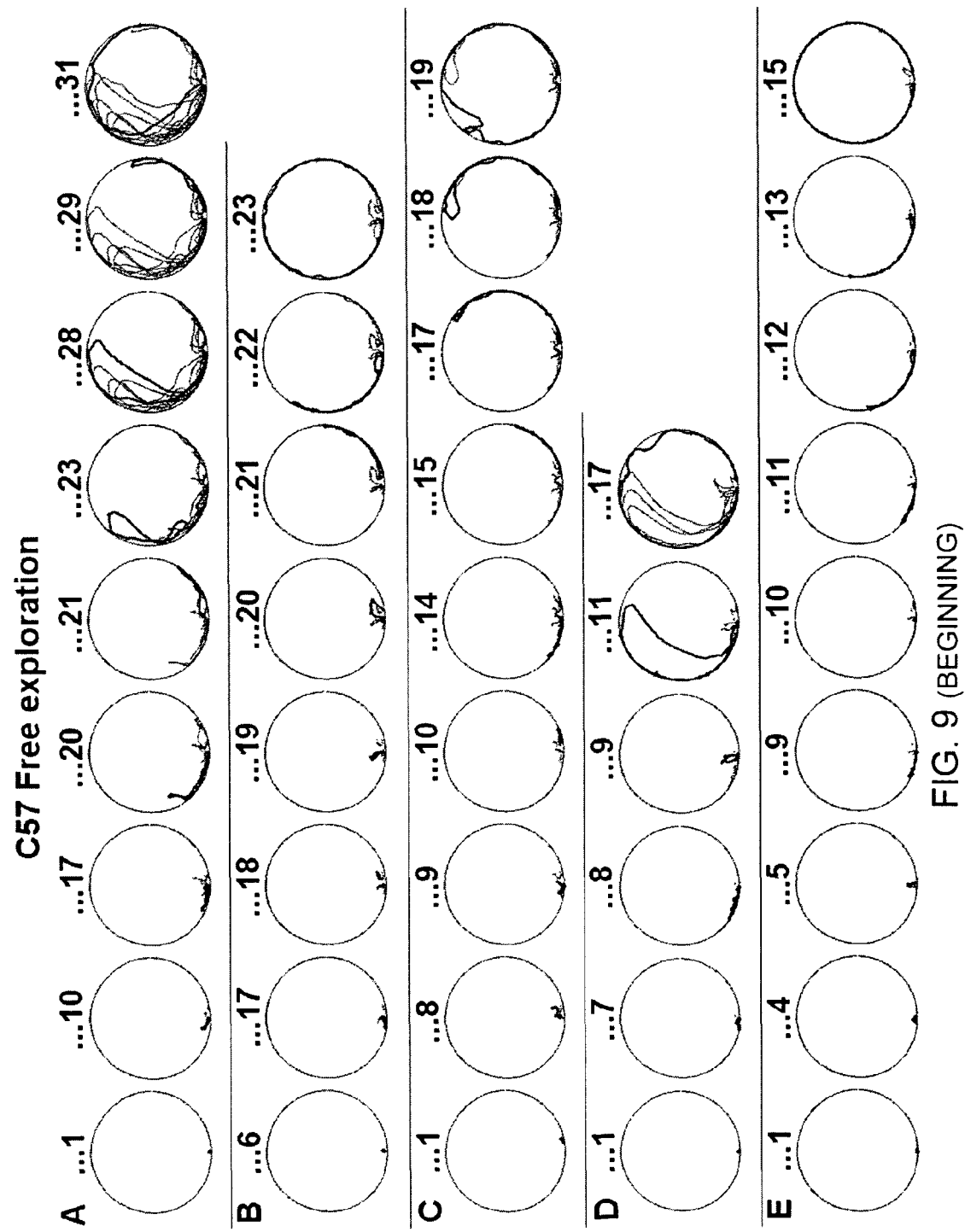
FIG. 9 (BEGINNING)

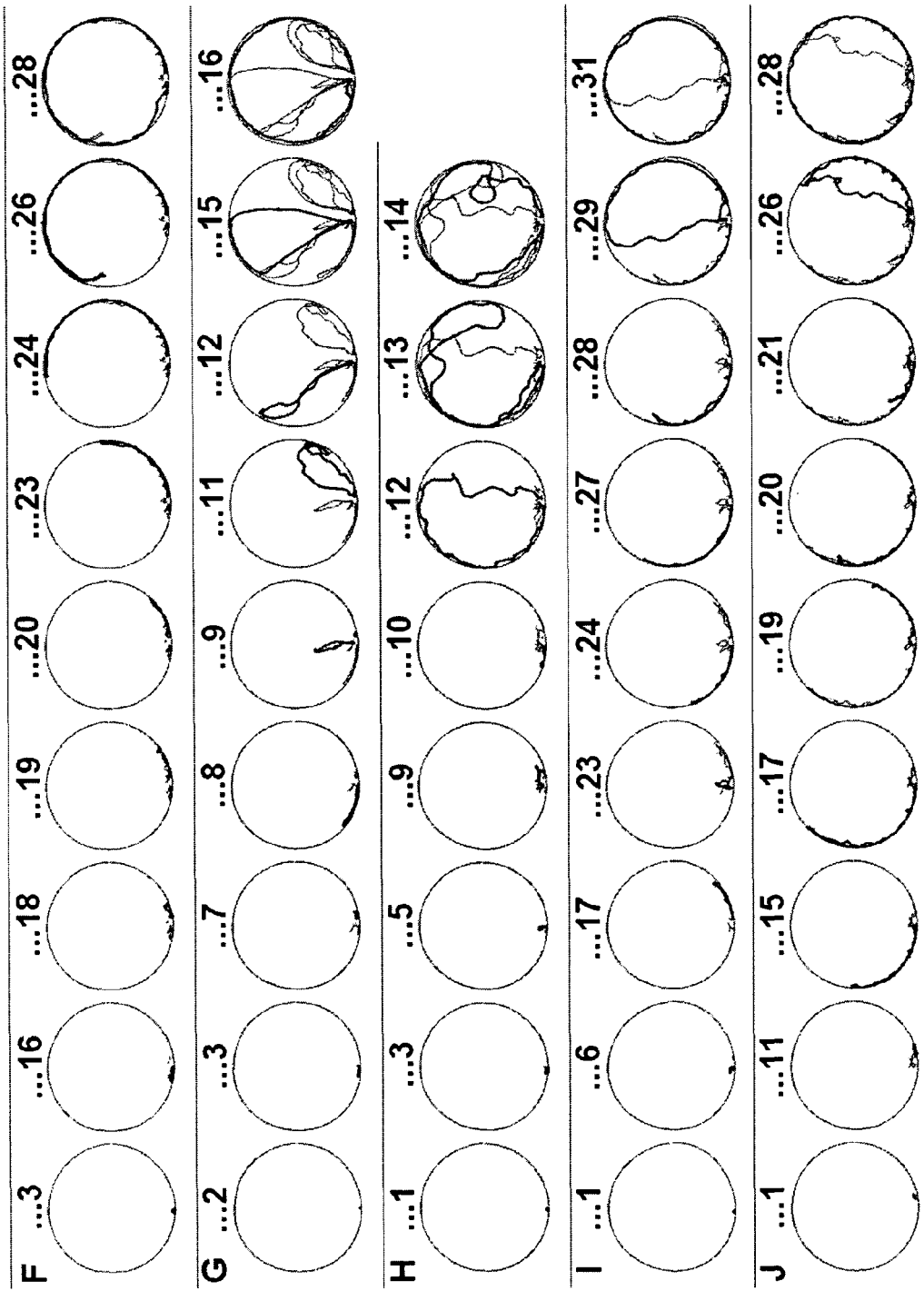
FIG. 9 (END)

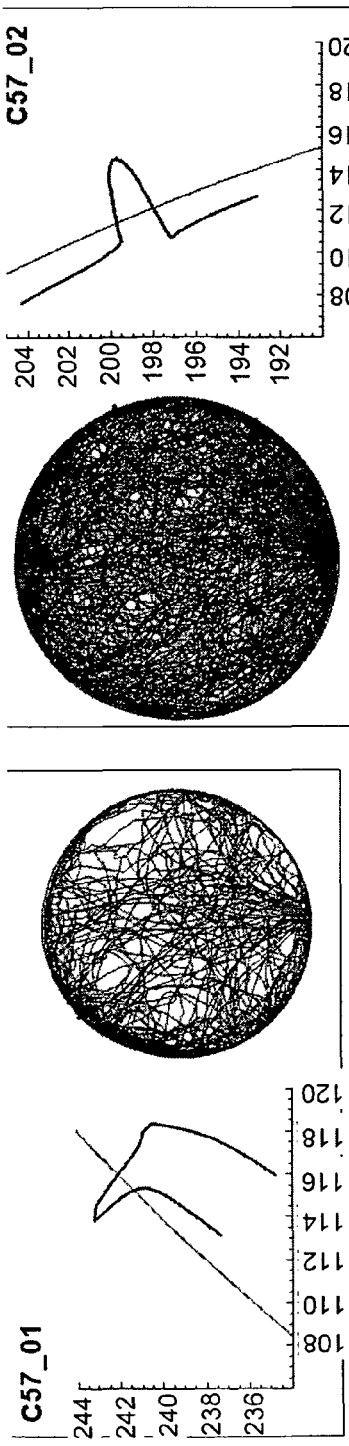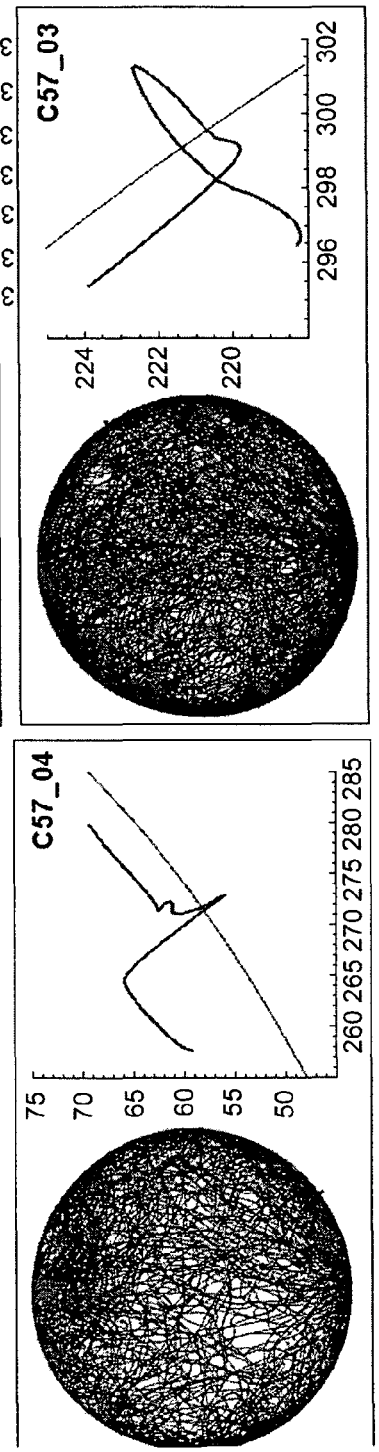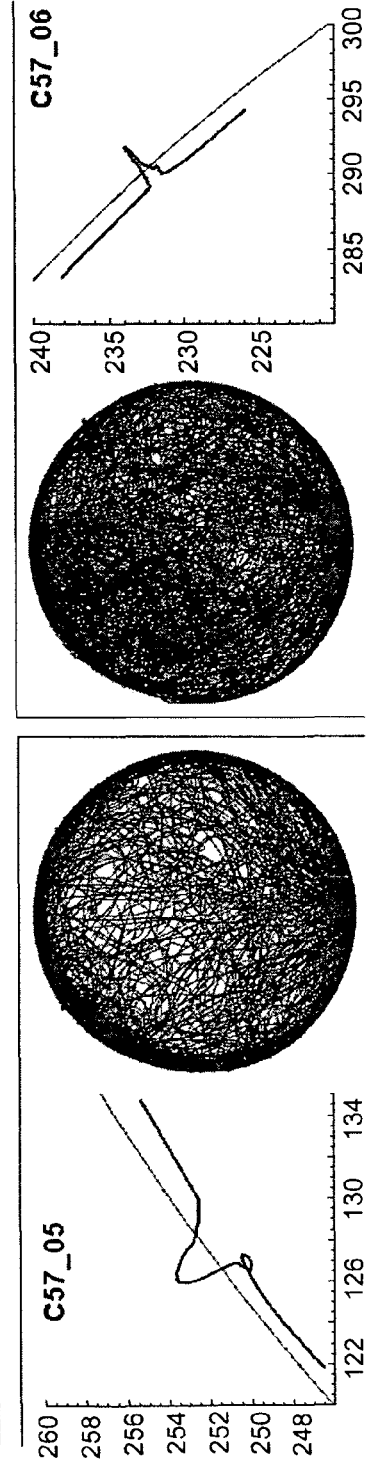
FIG. 10
(BEGINNING)

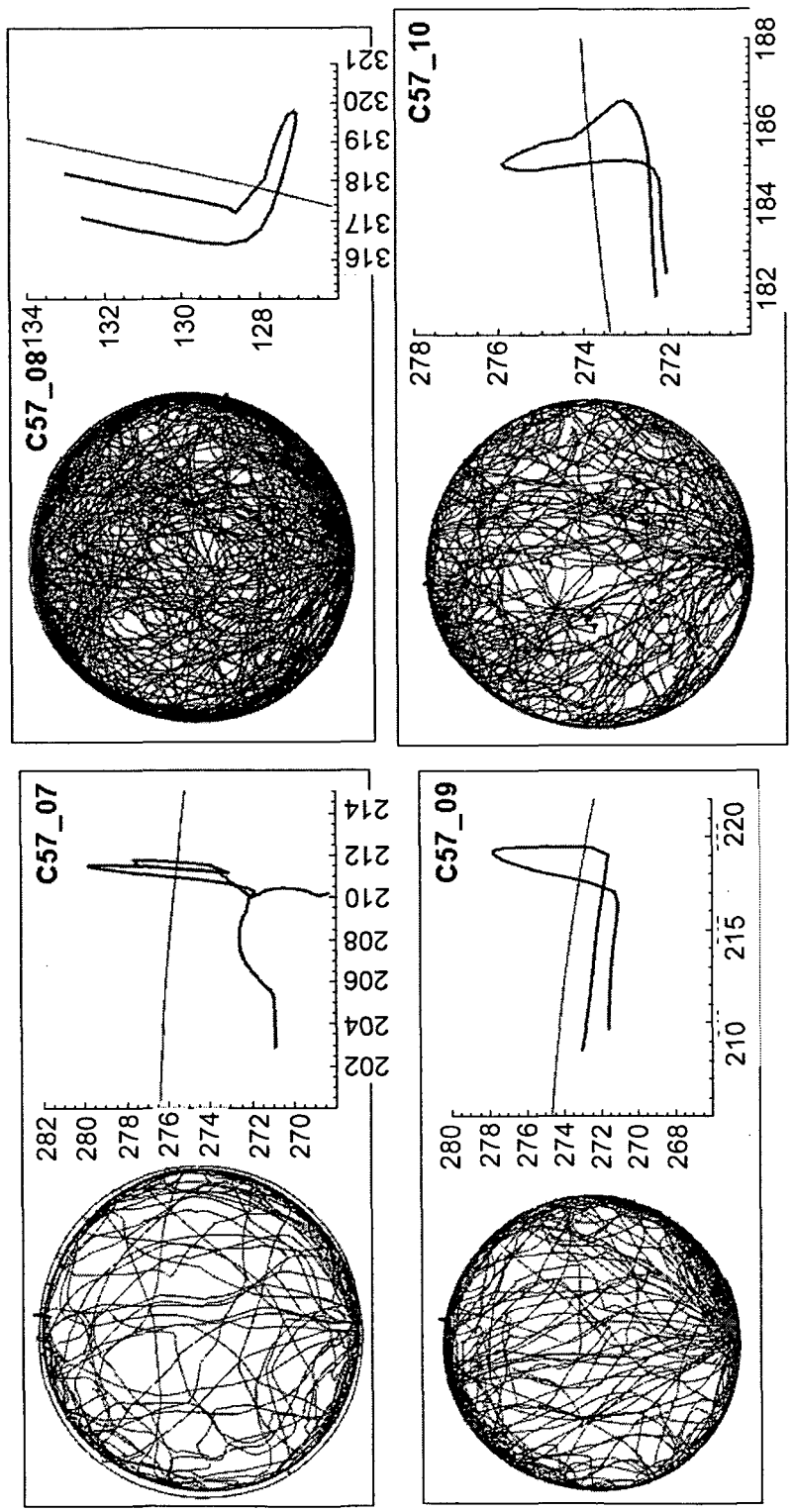
FIG. 10 (END)

SYSTEM AND METHOD FOR ANALYZING EXPLORATORY BEHAVIOR

FIELD OF THE INVENTION

This invention relates to systems and methods used for studying of exploratory behavior.

BACKGROUND OF THE INVENTION

The following prior art documents are considered as being useful for an understanding of the invention.

Anjum et al., 2006) F., Turni H., Mulder P. G., van der Burg J., Brecht M. (2006) Tactile guidance of prey capture in Etruscan shrews. *Proc Natl Acad Sci* USA. 103(44): p. 16544-9.)

Dvorkin, A., Benjamini, Y. & Golani, I. (2008) Mouse cognition-related behavior in the Open-Field: emergence of places of attraction. *PLoS Computational Biology* 4.

Drai, D., Benjamini, Y., Golani, I. (2000) Statistical discrimination of natural modes of motion in rat exploratory behavior. *Journal of Neuroscience Methods*, Vol 96, Issue 2, 2000, Pages 119-131

Drai, D. & Golani, I. (2001) SEE: a tool for the visualization and analysis of rodent exploratory behavior. *Neuroscience and Biobehavioral Reviews* 25, 409-426.

Drai, D., Kafkafi, N., Benjamini, Y., Elmer, G. & Golani, I. (2001a) Rats and mice share common ethologically relevant parameters of exploratory behavior. *Behav Brain Res* 125, 133-140.

Eilam, D. & Golani, I. (1988) The ontogeny of exploratory behavior in the house rat (*Rattus rattus*): the mobility gradient. *Developmental Psychobiology* 21, 679-710.

Eilam, D., Golani I. (1989) Home base behavior of rats (*Rattus norvegicus*) exploring a novel environment. *Behavioural brain research*, vol. 34, no 3, pp. 199-211

Frischholz, R., Wittenberg, T. (1997) "Computer Aided Visual Motion Analysis", Advances in Quantitative Laryngoscopy using Motion-, Image- and Signal Analysis, Erlangen.

Golani I, Wolgin D L, Teitelbaum P. (1979) A proposed natural geometry of recovery from akinesia in the lateral hypothalamic rat. *Brain Res.* 23; 164:237-67.

Golani, I., Bronchti, G., Moualem, D., and Teitelbaum, P. (1981) "Warm-up" along dimensions of movement in the ontogeny of exploration in rats and other infant mammals. *PNAS* vol. 78 no. 11 7226-7229

Golani, I., Benjamini, Y. & Eilam, D. (1993) Stopping behavior: constraints on exploration in rats (*Rattus norvegicus*). *Behavioural Brain Research* 53, 21-33.

Griebel, G., Belzung, C., Misslin, R. & Vogel, E. (1993) The free-exploratory paradigm: an effective method for measuring neophobic behaviour in mice and testing potential neophobia-reducing drugs. *Behav Pharmacol* 4, 637-644.

Gruntman, E., Benjamini, Y., Golani, I. (2007) Coordination of steering in a free-trotting quadruped. *Journal of Comparative Physiology A: Neuroethology, Sensory, Neural, and Behavioral Physiology* Vol 193, Number 3

Hamers F P T., Lankhorst A J., Van Laar A N., Veldhuis W B., Gispen W H., (2001) Automated Quantitative Gait Analysis During Over ground Locomotion in the Rat: Its Application to Spinal Cord Contusion and Transection Injuries. *Journal of Neurotrauma*, Volume 18, Number 2.

Hen, I., Sakov, A., Kafkafi, N., Golani, I. & Benjamini, Y. (2004) The dynamics of spatial behavior: how can robust smoothing techniques help? *Neuroscience Methods* 133, 161-172.

Horev, G., Benjamini, Y., Sakov, A. & Golani, I. (2007) Estimating wall guidance and attraction in mouse free locomotor behavior. *Genes, Brain and Behavior* 6, 30-41.

Kafkafi, N., Pagis, M., Lipkind D., Mayo C L., Benjamini Y., Golani I., Elmer G I., (2003) Darting behavior: a quantitative movement pattern designed for discrimination and replicability in mouse locomotor behavior. *Behavioural Brain Research*. Vol 142, Issues 1-2, 16 June, Pages 193-205

Kafkafi, N., Benjamini, Y., Sakov, A., Elmer, G. I. & Golani, I. (2005) Genotype-environment interactions in mouse behavior: a way out of the problem. *Proc Natl Acad Sci USA* 102, 4619-4624.

Knutsen, P M., Derdikman, D., and Ahissar E. (2005) Tracking Whisker and Head Movements in Unrestrained Behaving Rodents. *Neurophysiol* 93: 2294-2301.

Knutsen, P M., Pietr, M., and Ahissar, E., (2006) Haptic Object Localization in the Vibrissal System: Behavior and Performance. *J. Neurosci.* 26(33):845-8464

Lipkind, D., Sakov, A., Kafkafi, N. & Elmer, G. I. (2004) New replicable anxiety-related measures of wall versus center behavior of mice in the Open Field. *Journal of Applied Physiology* 97, 347-359.

Luhmann, H. J., Huston, J. P. & Hasenohrl, R. U. (2005) Contralateral increase in thigmotactic scanning following unilateral barrel-cortex lesion in mice. *Behav Brain Res* 157, 39-43.

Mitchinson B., Martin C. J., Grant R. A., Prescott T. J. (2007), Feedback control in active sensing: rat exploratory whisking is modulated by environmental contact, *Royal Society Proceedings* B, 274(1613).

Morimoto, M H., and Mimica MRM (2005) Eye gaze tracking techniques for interactive application. *Computer Vision and Image Understanding*, 98 4-24

Morris R G M, (1981) Spatial Localization Does Not Require the Presence of Local Cues. *Learning and Motivation* 12, 239-260 (1981)

Ohl, F. & Keck, M. E. (2003) Behavioural screening in mutagenised mice—in search for novel animal models of psychiatric disorders. *European Journal of Pharmacology* 480, 219-228.

Solstad, T., Boccara, C. N., Kropff, E., Moser, M. B. & Moser, E. (2008) Representation of Geometric Borders in the Entorhinal Cortex. *Science* 322, 1865-1868.

Spink, A J., Tegelenbosch, R A., Buma M O., Noldus L P P J. (2001) The Etho Vision video tracking system—A tool for behavioral phenotyping of transgenic mice. *Physiology and Behavior* 73, 731-744.

Szwed, M., Bagdasarian, K., Ahissar, E. (2003) Encoding of Vibrissal Active Touch. *Neuron*, Volume 40, Issue 3, Pages 621-630

Szechtman, H., Ornstein, K., Teitelbaum, P. & Golani, I. (1985) The morphogenesis of stereotyped behavior induced by the dopamine receptor agonist apomorphine in the laboratory rat. *Neuroscience* 14, 783-798.

Tchemichovski, O., Benjamini, Y., Golani, I., (1998) The dynamics of long-term exploration in the rat. Part I. *Biological Cybernetics*. Vol 78, Issue 6, pp 423-432.

Valente, D., Golani, I., Mitra P P. (2007) Analysis of the trajectory of Drosophila melanogaster in a circular open field arena. *PLoS ONE*. 2007; 2(10): e1083. Published online.

Voigts J., Sakmann, B., Celikel, T. (2008) Unsupervised Whisker Tracking in Unrestrained Behaving Animals. *J Neurophysiol* 100: 504-515.

Wolfram, S. W. R., Inc. (2005) Mathematica Edition: Version 5.2 (Champaign, Ill.).

Yaniv, Y. & Golani, I. (1987) Superiority and inferiority—a morphological analysis of free and stimulus bound behavior in honey badger (*Mellivora capensis*) interactions. *Ethology* 74, 89-116.

U.S. Pat. No. 7,068,842.

US Patent Publication No. 2007/0265816.

U.S. Pat. No. 7,269,516.

International Patent Publication WO 2005/001768 A1.

http://www.tau.ac.il/~ilan99/see/help/.

http://www.r-project.org/http://www.tau.ac.il/_ilan99/see/help.

Exploration is the process by which animals and humans familiarize themselves with a novel environment. The drive to explore is so fundamental that it overrides most other drives: humans enter life-threatening situations in their exploration of ever new territories on the planet and in outer space, and a dam rat placed in an unforeseen environment together with its pups, first explores the new territory extensively and only then attends to the pups.

Exploration is studied by placing a subject in an "arena", tracking the location of the subject over a time period, and then analyzing the subject's movements in order to deduce aspects of the subject's behavior and mental state. A tracking system is typically used that allows acquisition of data of sufficiently high resolution at the level of the path (Spink et al, 2001) or at the level of the parts of the subject's body (Frischolz and Wittenberg 1997; Hamers et al., 2001). Methods for analyzing the subject's high resolution motion tracking are known that provide a description of the subject's behavior at a correspondingly high resolution (Drai and Golani 2001; Horev et al., 2006; Kafkafi et al, 2003; Gruntman et al., 2006; Drai et al., 2001; Golani et al., 1993; Yaniv and Golani, 1997)

The study of animal exploration is used to understand and test the effects of pharmacological and genetic manipulations in animal models of human diseases of the central nervous system (CNS). Rodent exploratory behavior is presently one of the standard animal models for diseases of the CNS because of the genetic similarity of the mouse to humans, and because mice demonstrate a wide spectrum of exploratory behavior profiles. The various mouse strains and preparations highlight different aspects of behavior, and many strains demonstrate maladaptive behaviors. However, mouse exploratory behavior of even an empty circular arena is extraordinarily complex. A mouse placed in a circular arena traces a long meandering path that is difficult to analyze.

Exploratory behavior has been studied in rodents in two types of arenas: mazes (Buresova and Bures, 1982; Griebel et al., 1993), and open field tests (Gershenfeld et al., 1997). While mazes are most appropriate for testing formulated hypotheses because they impose a priori constraints on the path, the paucity of such constraints in the open-field arena highlights intrinsic constraints, offering unexpected hypotheses (Dvorkin et al., 2008; Horev et al., 2007; Kafkafi et al., 2003; Kafkafi and Elmer, 2005; Golani et al., 1993; Tchernichovski et al., 1998). The open-field is one of the most common tests in the study of navigation (Solstad et al., 2008), anxiety (Lipkind et al., 2004), lesion-(Luhmann et al., 2005), drug-induced (Belzung and Griebel, 2001), and genetically-engineered, behavior (Bolivar et al., 2000), and in the behavior of animal models of psychiatric diseases (Clement et al., 2002; Ohl and Keck, 2003).

US Patent Publication No. 2007/0265816 to Elmer et al (2008) discloses a system and method for the analysis of exploratory movement to identify behavioral signatures. A test subject in a pen is allowed to explore for a period of time, after injecting it with a candidate drug or control vehicle. The test subject's movement is monitored and its locations are stored. Momentary values such as velocity, acceleration, curvature, time of occurrence, and location are computed from the location time series to obtain momentary combinations of these behavioral features, and relative frequencies of performance of these combinations are calculated. For each drug, differences between the relative frequencies in the candidate drug and control groups are tested.

U.S. Pat. No. 7,068,842 discloses a system and method for object identification and behavior characterization using video analysis. The system scores ad hoc predetermined categories of behavior (e.g., rearing, digging and grooming episodes) using features of the subject's video image (such as its silhouette). Several features of behavior are packaged into behavior patterns by a CPU that is trained by a human observer to define these patterns. The sequence of discrete behavior patterns performed by the organism throughout the session is used for making comparisons.

U.S. Pat. No. 7,269,516 discloses a system that assesses animal behavior on the basis of sensors that collect a variety of parallel physical and biological data including behavior, neurology, biochemistry and physiology, from a test subject located in its own cage, providing information on a drug's signature.

International Patent Publication WO 2005/001768 A1 (2005) discloses an automated system and method for assessing and analyzing motor or locomotor behavior or neurologic dysfunction in animal models. The system captures and scores locomotor coordination of gait, motor coordination, movement and flexion of limbs, position of abdomen, tail, limbs and paws and body posture. Analysis includes measurement on a continuous scale to assess motor behavior based on comparing motor behavior of the experimental animal with a baseline motor behavior.

In other existing tests the measured parameters rely either on performing a task, such as finding a hidden platform in a water maze (Morris, 1981) or reaching a goal in a dry maze (hypothesis driven measures), or on summarizing pooled behavior throughout the entire session while disregarding the developmental process (e.g., overall distance traveled in the session, overall time spent in the center of the arena throughout the session), for example as described in Kafkafi et al., 2005).

SUMMARY OF THE INVENTION

The present invention provides a system and method for analyzing a subject's exploratory behavior. The system of the invention comprises a tracking device configured to track the motion of the subject and to generate one or more signals indicative of the subject's motion. The signals are input to a CPU that identifies in the signals one or more sequences of repeated motions, or one or more sequences of sequences of repeated motion. For each identified sequence of repeated motion, the CPU determines a clock time t at which the occurrence occurred or a clock time interval during which each occurrences occurred. A value of one or more predetermined parameters of at least some of the occurrences are calculated. A time dependence of the one or more predetermined parameters during the sequence of repeated motion or the sequence of sequences of repeated motion is then calculated. The predetermined parameters may be, for example, any one or more of the following parameters:

(a) a time of the motion;
(b) position,
(c) velocity,
(d) acceleration, (e) extent; and (f) curvature;

The calculated time dependence may then compared to a reference value. The results of at least some of the calculations are displayed to a user, for example on a CRT screen.

The tracking system may include, for example, one or more digital video cameras that obtain images of the subject over a time period. Alternatively or additionally, tracking of the subject may be performed using radio-tracking or Global Positioning System (GPS) technology. In another embodiment of the invention, useful in the study of the movement of animals or humans in natural or urban environments, the tracking device may utilize radio-tracking or Global Positioning System (GPS) technology.

In a preferred embodiment, the CPU first transforms the clock time scale t to a transformed time scale t' and then calculates the time dependence of the one or more variables on the transformed timescale t'. As shown below, the transformed time scale t' may be calculated in an algorithm involving t and at least one of the calculated parameter values. The time transformation may be, for example, an ordinal number of each occurrence of the motion in the sequence of repeated motions. As another example, the time transformation may be the cumulated time spent by a subject performing a predetermined motion in a sequence of repeated motions. In a sequence of sequences of repeated motion, the time transformation may be the clock time of the first performance of each motion in each of the sequences of repeated motion.

The CPU may be configured to calculate values of one or more derived parameters in a calculation involving the values of the one or more of the predetermined parameters. The calculation may be performed over a time window selected as required in any application. The computation may further involve computing a composition of any two or more of the computed variables.

The system of the invention may also include an arena in which the subject's movement is confined. In this case, the system may include an enclosure, such as a cage attached to the arena configured to contain the subject and further configured to allow passage of the subject between the arena and the enclosure. For a rodent, the arena may be a flat surface surrounded by high walls or deep cliffs. For a fly or other insect, the arena may be a Petrie dish or other container.

The present invention is based on the novel observation that exploratory behavior typically unfolds in an experimental setup gradually. Such gradual unfolding involves sequences of repeated, back and forth motions performed by an exploring subject. Thus, in accordance with the method of the invention, sequences of repeated motions performed by a subject are identified, and the properties of each occurrence of the repeated motion is measured, and a time dependence of the measures is quantified in various ways, as explained below.

A single episode of a motion performed by the subject occurs over a time interval that begins with a reference value of one or more variables. During the motion, the values of the variables change but eventually return to the reference values at the termination of the motion. The reference values of the variables may be predetermined or algorithmically derived from part or the entire dataset. For example, a motion may be a "roundtrip" which is a motion that starts and end in the garden (a region of the arena adjacent to the doorway between the arena and an enclosure such as a cage, as described above), where the boundary of the garden is algorithmically derived from the data series.

In one embodiment of the invention used to study exploratory behavior in rodents, the system comprises a home cage connected to a large circular arena. The sequence of repeated motions along the wall (borderline roundtrips) defines the "One Spatial Dimension", and the maximal angular distance along the wall from the garden quantifies the freedom of movement in this dimension. The slope of the maximal angular distance along the wall as a function of time (clock time or rescaled time) quantifies the rate of build up of exploration along this dimension. Similarly, other sequences of repeated motions define the zero, two, and three spatial dimensions. An example of a two-dimension motion is an incursion towards and away from the center of the arena. In this case, a parameter of the motion might be the distance of the subject from the border of the arena, and the reference value of this parameter may be 0 (the subject is located at the border of the arena). An example of a three-dimension movement is jump in the vertical dimension, and the parameter may be the subject's height above the floor of the arena. The reference value of this parameter may also be 0 (the subject is in contact with the floor of the arena).

The above embodiments analyze behavior at the path scale. Other embodiments include an analysis of movement at the joints scale. The time dependence of the joints scale describes an extent of mobility, with immobility as the reference value. This scale can be used to detect increasing mobility (warm up) and decreasing mobility (shut down). The spatial dimensions of the joints scale may include any one or more of the following:

(a) 1. Horizontal movement (lateral movement of the parts of the trunk that are recruited into movement in a cephalo-caudal order: lateral head movements, then lateral forequarters movement, then pivoting around hind legs), (b) 2. Forward movement (stretching forward of head and neck, stretching forward of trunk, forward progression), (c) 3. Vertical movement (head raising, forequarter raising, rearing on hind legs).

(d) horizontal head movements'

(e) horizontal chest and head movements;

(f) horizontal pelvis, chest, and head movements;

(g) forward head movements'

(h) forward chest and head movements;

(i) forward pelvis, chest, and head movements;

(j) forward progression;

(k) vertical head movements'

(l) vertical chest and head movements; and (m) vertical pelvis, chest, and head movements.

These spatial dimensions are laid down by the animal in a stable order during transition out of immobility (Golani, 1992; Eilam and Golani, 1988) and are eliminated in the reverse order, last in first out, under the influence of, e.g., dopamine stimulant drugs, respectively increasing or decreasing the freedom of movement of the organism (Szechtman et al, 1985).

The system according to claim 14 wherein the CPU is further configured to to identify one or more sequences of repeated motions, the motions being selected from:

The dynamics of unfolding of the freedom of movement of a mouse is quantified in some embodiments in terms of the following parameters: i) The timing and/or temporal order of emergence of each of the spatial dimensions ii) The dynamics of build up of amplitude (range) within each spatial dimension. iii) The dynamics of build up of direction changes within each spatial dimension (freedom within dimensions), and in some embodiments, also iv) the timing of emergence of specific developmental landmarks (see below).

The method and system of the invention may be used to determine the effects of a drug or other treatment on the behavior of a subject by comparing the parameters measuring the subject's motion before and after the treatment or by comparing a treated subject with an untreated subject.

Embodiments of the invention may include sensors that are attached or implanted within a subject and collect a variety of physiological, biochemical, and biological data from the subject, so as to correlate the subject's behavior with the subject's emotional or cognitive state. For example, the effect of a drug on both the behavior and physiology may be determined simultaneously. Sensors recording electrophysiological activity in the brain can also be used for electrical stimulation of brain tissue and subsequent estimation of the effect on the motion of the subject.

Thus, in its first aspect, the present invention provides a system for analyzing exploratory behavior of one or more subjects comprising:
(i) a tracking device configured to track motion of the subject and to generate a signal indicative of the subject's motion; and
(ii) a CPU configured to
  (a) identify in the signal one or more sequences of repeated motions, or one or more sequences of sequences of repeated motion;
  (b) for each of the one or more sequences of identified repeated motions:
    (i) determine for each occurrence of the repeated motion one or both of a clock time t at which the occurrence occurred or a clock time interval during which the occurrence occurred;
    (ii) calculate for each occurrence of the repeated motion a value of one or more predetermined parameters of the occurrence of the motion; and
    (iii) calculate a time dependence of the one or more predetermined parameters during the sequence of repeated motion or the sequence of sequences of repeated motion.

In its second aspect, the present invention provides a method for analyzing exploratory behavior of one or more subjects comprising:
(a) a tracking motion of the subject;
(b) identifying one or more sequences of repeated motions performed by the subject, or one or more sequences of sequences of repeated motion performed by the subject;
(c) for each of the one or more sequences of identified repeated motions:
  (i) determining for each occurrence of the repeated motion one or both of a clock time t at which the occurrence occurred or a clock time interval during which the occurrence occurred;
  (ii) calculating for each occurrence of the repeated motion a value of one or more predetermined parameters of the occurrence of the motion; and
  (iii) calculating a time dependence of the one or more predetermined parameters during the sequence of repeated motion or the sequence of sequences of repeated motion.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 4 shows the order that each of 12 BALB/c mice subjects performed 12 specific landmark events;

FIG. 7 shows the build-up of amplitude and complexity of incursions, in BALB/c mice;

FIG. 9 shows path plots of the developmental sequence and build up of the staying-in-place (one dimensional), and borderline (two dimensional) stages in BALB/c mice tested in a walled, forced setup; and FIG. 10 shows the exhaustion of the radial (two) dimensional before the onset of Jumps on the wall (three dimensional) in the free C57BL/6 mice.

DETAILED DESCRIPTION OF EMBODIMENTS

Figure 1:
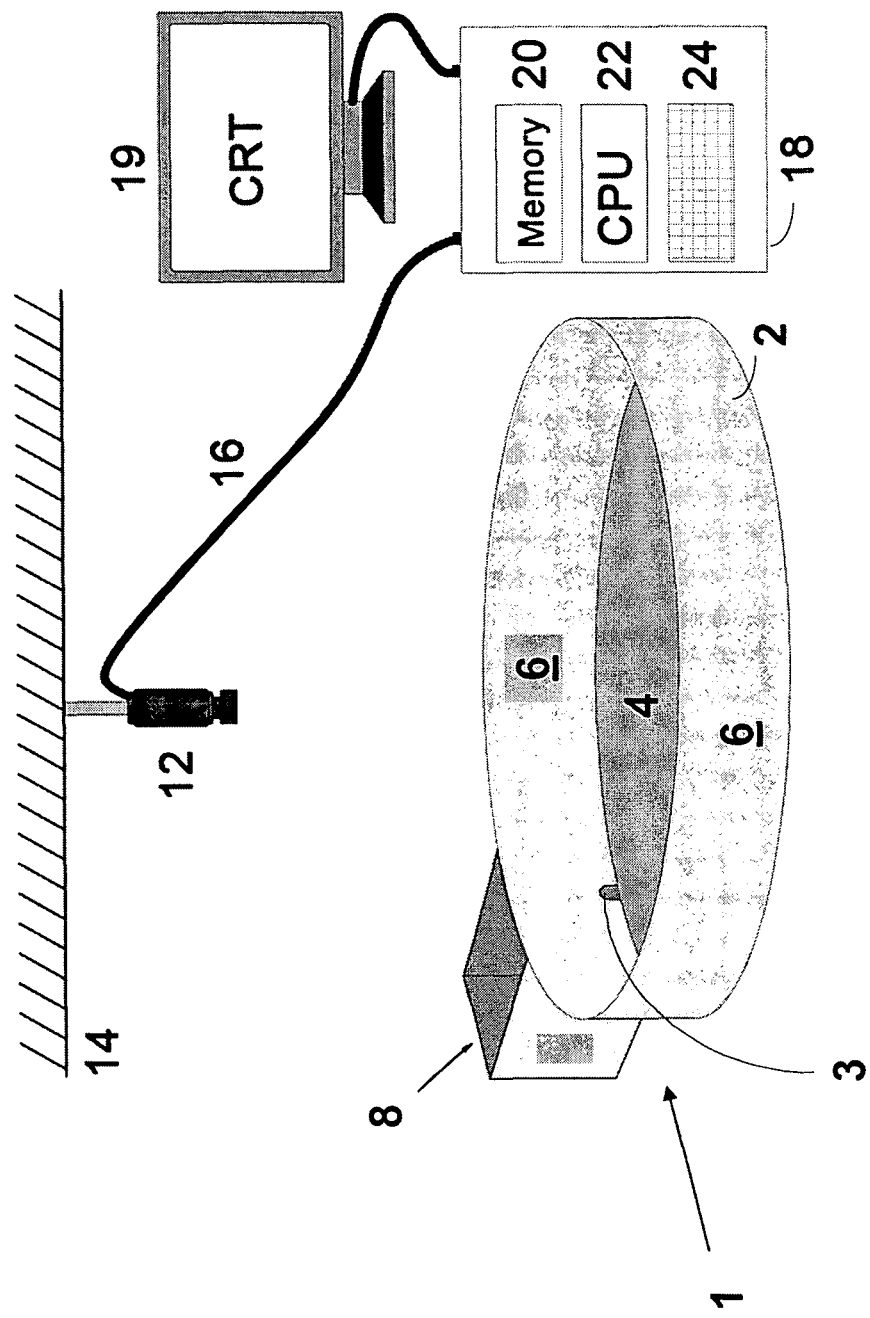
FIG. 1 shows a system for studying a subject's exploratory behavior in accordance with one embodiment of the invention.

FIG. 1 shows a system 1 for studying a subject's exploratory behavior in accordance with one embodiment of the invention. The embodiment of FIG. 2a may be used, for example, to study animal behavior in a rodent. However, this is by way of example only, and the invention may be adapted for the study of exploratory behavior of any animal or human subject.

The system 1 comprises an arena 2 adapted to receive the subject whose motion is to be tracked and analyzed. For a subject that is a rodent, the arena 2 may have a generally circular base 4 and side walls 6 that are sufficiently high or cliffs that are sufficiently deep to prevent the subject from escaping from the arena 2. This is by way of example only, and the arena 2 may have any shape as required in any application. The interior of the arena 2 within the walls 6 may be completely empty, as shown in FIG. 1. Alternatively, the interior of the arena maybe provided with various accessories such as a maze or other test object, as required in any application. The arena 2 may be attached to a cage 8 in which the subject is initially placed. Passage of the subject between the cage and the arena through a doorway 3 may be controlled so that the subject can pass between the arena and the cage only at selected times. Alternatively, passage between the arena and the cage may always be unobstructed, so that the subject can pass between the arena and the cage at any time.

The system further comprises a data acquisition system 10. The data acquisition system 10 includes a tracking system that may include, for example, one or more digital video cameras 12. One or more of the cameras 12 may be mounted on a bracket 14 so as to allow the cameras 12 to obtain images of the arena over a time period. In a preferred embodiment, two or more video cameras are used to generate stereo pairs of images of the arena to provide a 3D description of the subject's movement in the arena. Additional high-speed (preferably at least 200 frames per second) video cameras may be used that are zoomed in on objects placed in the arena. These cameras can be activated by motion detectors whenever the subject enters the camera's field of vision. Alternatively, a mobile camera can be used that follows the subject close-up from below, through a transparent glass floor 4 of the arena. A camera below the floor 4 obtains images providing data on the movements of the separate parts of the body including appendages and whiskers.

Images of the arena obtained by the camera 12 are sent over a transmission line 16, which may be a wired or wireless transmission line, to a processing unit 18. The processing unit 18 includes a memory 20, a CPU 22, and a user input device such as a keypad 24. Images obtained by the camera are time stamped by either the camera 12 or the CPU 22, so that the time that each image was obtained is stored in the memory with the image. The input device 24 is used to input information relating to the subject, or the conditions of the experiment, and to input parameter values of the experiment, such as duration of the tracking, image acquisition rate, etc. The processing unit 18 may also include a display device, such as a CRT screen 19 for displaying images obtained by any of the cameras, various data, or other information relevant to the experiment.

The CPU is configured to analyze a video stream of images obtained by the camera 12. An image is fetched from the memory 20. The CPU 22 then determines from the image the location of the subject in the arena 2 at the time the image was obtained. Locating the subject in the image may consist of determining the location in the arena of specific parts of the subject's body, such as the parts of the trunk, head and neck, and paws of the subject. After having determined the subject's location data in the image, the CPU 18 determines from the subject's location data any one or more of the subject's velocity, acceleration, path curvature, heading direction, trunk orientation, direction of shift of weight of the animal's center, orientation and shift of orientation of the animal's trunk and spatial spread vectors of the subject's whole body and/or body parts. For example, the CPU may find an algebraic expression, for example a polynomial, for the location as a function of time using statistical methods and derive the above quantities as derivatives of the algebraic expression. Sequences of repeated motions may be detected, indexed and prepared for analysis using the "Software for the Exploration of Exploration" (SEE) as a tool, including Path Smoother (Hen et al., 2004) and then SEE Path Segmentor, Arena Builder, and SEE Files Creator (http://www.tau.ac.il/~ilan99/see/help).

For the tracking of the subject in the arena, any or all of the following prior art methods may be used:

1. The location coordinates of the geometrical center of the organism as well as the orientation of the trunk can be obtained by using conventional tracking systems (Branson et al., 2009; Spink et al., 2001; Valente et al., 2008).

2. The coordinates of the parts of the body (joints), including all legs and the parts of the trunk (lower torso, upper torso, head) can be obtained by using appropriate tracking methods (Frischolz and Wittenberg, 2001). Whisker movements can be tracked (Knutsen et al., 2005; Szwed et al., 2003, Voigts et al., 2008), and eye movements can be tracked as well (Morimoto and Mimica, 2005).

3. Computerized high-throughput technology for data preparation for analysis is also available (http://www.tau.ac.il/~ilan99/see/help/; Drai and Golani, 2001). Preparation for analysis includes segmentation into the natural building blocks of behavior. These include lingering episodes, progression segments (Drai et al., 2000), home bases (Eilam and Golani, 1989), roundtrips performed from and to the home base Tchrnichovski et al., 1998; Drai et al., 2001a), incursions into the center (Lipkind et al., 2004), borderline movements, outbound and inbound portions of excursions, and many other types of segments. Segmentation is based on intrinsic geometrical and statistical properties of the movement material (Drai et al., 2000; Lipkind et al., 2004). Segments are characterized by means of, medians, minima, maxima, various quantiles of features related to location and all the above-listed first-, second-, and third-derivatives. The quantification of the freedom of movement of the organism is based on the smoothed data, the computed smoothed derivatives, the segmented data and their computed statistical properties.

4. Analysis may be performed by computational programming environments such as Mathematica® (Wolfram, 2005), Matlab (Matlab for Biological Computations, 2009), or the open source code R (R-project; http://www.r-project.org/).

5. A movement notation analysis system may be used for the analysis of the relations and changes of relation between the parts of the body and information that can be derived from these (movements at the joints scale (Eshkol and Wachmann, 1956).

The calculated rate of change can be stored in the memory 20, or displayed on the CRT 19.

The associated parameters of the extent of motion may be for example, any one or more of the following: (1) time of start and time of end, (2) cumulative time in Arena up to the occurrence of said motion, (3) location parameters, (4) metric and angular distance traveled in the motion, (4) spatial spread, (5) curvature at different scales, average median and other quantiles of speed, and of (6) acceleration, (7) maximal distance from doorway, (8) maximal distance from border (9) percent of body in the arena.

A sequence of repeated motion may consist, for example, of repetitions of any one of the following motions:

a) "Entries" Each entry motion consists of penetration into the arena from the cage and complete departure back into the cage.

b) "Peep&Hide"—Each "Peep&Hide" motion, is an entry in which the subject introduces only its snout/head/or other body part into the arena from the cage and then withdraws into the cage. The CPU may calculate all of the above nine associated parameters of the extent of motion. In particular the maximal percentage of the mouse's body within the arena (parameter 9) determines whether the motion is that of Peep&Hide.

c) "Cross&Retreat"—Each Cross&Retreat motion comprises an entry into the arena, where the percentage of the mouse's body within the arena (parameter 9) is 100%, i.e. when the subject has fully crossed the doorway from its cage into the arena) followed by withdrawal back into the cage retreating backwards. Backward retreat is identified from the tracked direction of the subject's mid-sagittal plane. The algorithm calculates this parameter as well as the other parameters (1)-(9).

d) "CircleInPlace"—Each CircleInPlace motion comprises that part of the entry where the subject is in the arena, and performs near the doorway a rotation of the longitudinal body axis until the subject's snout is directed towards the doorway. The definition of a garden can be derived in various ways. For example, the density of the time at location over the arena is calculated by the CPU, yielding a single high Gaussian near the doorway, whose quantiles define the garden: only those path segments that pass this individually determined threshold belong to the sequence of roundtrip motions.

e) "DepartHeadOn"—Each of the DepartHeadOn motions comprises an Entry that terminates with departure from the arena head-on into the cage. Head-on departure is identified by the heading direction calculated at departure.

f) "Roundtrips"—Each roundtrip motion consists of movement away from and back to garden.
g) "SimpleRoundtrips"—Each SimpleRoundtrip motion is a Roundtrip that includes a single outbound segment identified by a decreasing angular coordinate of location, followed by a single inbound segment identified by a nonincreasing angular coordinate of location
h) "BorderlineRoundtrips" Each BorderlineRoundtrip motion is a roundtrip whose maximal distance from the wall (measure 8) is below a threshold parameter value. The parameter value is determined by the CPU by analyzing the distribution of the maximal distance from border of all roundtrips, determining its Gaussian components and determining the threshold according to the zero Gaussian component closest to the border.
i) "SimpleBorderlineRoundTrip"—Each SimpleBorderlineRoundTrip motion is a roundtrip that is both a simpleRoundtrip and a BorderlineRoundTrip.
j) "HomeRelatedShuttle"—A BorderlineRoundtrip that is not simple includes at least one pair of inbound and outbound consecutive segments (in that order). Each such pair of segments is a HomeRelatedShuttle motion.
k) "CageSkip" Each CageSkip motion is a homeRelatedShuttle whose minimal distance from doorway falls below the garden boundary parameter, indicating that the change in direction occurred within the garden.
l) "BorderlineRoundTtripInOtherDirection" Each BorderlineRoundTtripInOtherDirection is a borderline round trip whose maximal angular coordinate of location is different in sign to the maximal angular coordinate of location of the first Roundtrip. Recall that positive values of angular position represent borderline round trips to one side whereas negative values stand for borderline round trips to the other side.
m) "FullCircle"—Each FullCircle motion is a Roundtrip whose range of angular coordinate of location is close to 360°. Thus each such motion consists of substantially complete full circle, i.e. a continuous borderline roundtrip that covers most of the arena circumference.
n) "SimpleIncursion"—Each SimpleIncursion motion comprises a single centerbound segment identified by a nondecreasing radial coordinate of location, followed by a single borderbound segment identified by nonincreasing radial coordinate of location. The maximal distance from the border reached has to be above a threshold. The threshold is determined by the CPU by analyzing the distribution of the maximal distance from border of all incursions and determining the threshold for the Gaussian component closest to the border.
o) "WallRelatedShuttle"—An Incursion that is not simple is bound by definition to include at least one pair of borderbound and centerbound consecutive segments (in that order). Each such pair of segments is a WallRelatedShuttle motion.
p) "CenterReachingRountrip"—Each CenterReachingRountrip motion is a roundtrip that includes an Incursion whose maximal distance from border is more than a predetermined proportion close to 1 of the maximal possible radial coordinate for a location in the arena. The proportion may be, for example, 0.95.
q) "Jumping"—Each Jumping on the wall is a motion involving release of hind feet contact with the ground. During jumping the mouse traces a path that appears to cross the boundary of the arena when the path is viewed from the point of view of the camera. The protrusions of the boundary by the path traced during jumping are captured by the CPU which may calculate both measures (1)-(8) and maximal deviation of location in the vertical dimension.

For each identified motion, a sequence of repeated motions throughout the exploration session is identified. The CPU calculates measures of time dependence of the parameters of the motions such as the parameters (1)-(9) above.

The CPU may be configured to detect sequences of sequences of repeated motion. For example, the following sequence of sequences of repeated motion has been observed to occur in mice, as demonstrated in the examples below:
(1) A sequence of Peep&Hide motions;
(2) A sequence of Cross&Retreat motions
(3) A sequence of CircleInPlace motions
(4) A sequence of DepartHeadOn motions
(5) A sequence of SimpleBorderlineRoundTrip motions
(6) A sequence of HomeRelatedShuttle motions
(7) A sequence of BorderlineRoundTtripInOtherDirection motions
(8) A sequence of FullCircle motions
(9) A sequence of SimpleIncursion motions
(10) A sequence of WallRelatedShuttle motions
(11) A sequence of CenterReachingRountrip motions
(12) A sequence of Jumping motions When each of the sequences in a sequence of sequences is parameterized by the time at which the first motion of the sequence was performed, the CPU can express the time dependence of the sequence of sequences. The calculation of the time dependence may involve performing a transformation of clock time t to a transformed time scale t'. The transformed time scale t', for example, may be the rank of the clock time t at which a sequence of repeated motion in the sequence of sequences began. In a sequence of sequences of repeated motions, the first occurrence of a motion in a sequence of repeated motion is referred to herein as a "landmark" of the motion.

The ordinal number of the events listed above, the pairs of indexes marking their starts and ends, and the parameters of extent associated with each event may be used to calculate the dependence of the sequences of repeated motions on time directly, or as resealed by the level of accumulated activity expressed by the measured parameters. They may also be used to calculate the time dependence of the freedom of movement of the mouse: the motions 1 to 4 in the above sequence of sequences mark growth of freedom of movement in zero spatial dimensions, the motions 5 to 8 mark and quantify growth of movement in one spatial dimension, the motions 9 to 11 mark growth and are used to quantify movement in two spatial dimensions, and the motion 12 marks growth and is used to quantify movement in three spatial dimensions. The locations, times and temporal order of these motions can be used to measure and quantify the emergence of freedom or spatial dimensionality of the movement.

EXAMPLES

Materials and Methods

Animals.
The BALB/c mice (n=12 males, 11 weeks of age) were purchased from Harlan laboratories Israel and kept in a 12:12 light cycle (Light: 06:00-18:00), singly housed for 2 weeks before testing, at 22° C. room temperature with water and food ad libitum, maintained in facilities fully accredited by NIH Animal Welfare Assurance Number A5010-01 (TAU). The studies were conducted in accordance with the Guide for Care and Use of Laboratory Animals provided by the NIH, 'Principles of Laboratory Animal Care' (NIH publication no. 86-23, 1996). To rule out the possibility that behavioural asymmetry reflected an absence of Corpus Callosum in some of the BALB/c mice, all tested mice were screened by fMRI and found to have this structure. To obtain a wider perspective on the sequential order of patterns we videotaped in the free setup and examined both C57BL/6 and first-generation-in-captivity wild-caught mice (n=10 per group).

Experimental setup. The Dimensionality Emergence assay (DIEM) setup consists of a 250 cm diameter circular arena having a non-porous gray floor illuminated with an IR projector (880 nm) and dim white light (<1 Lux) placed on the ceiling above arena centre. The arena is surrounded by a 60 cm high, primer gray continuous wall with a single 4×5 cm' doorway leading to an infra-red lit Plexiglas home-cage (30× 40×50 cm) containing wood- or paper-shavings from the original home cage and food and water ad lib. A small Plexiglas box attached to the home cage doorway on its inner side forces the mouse to pass through it on its way into the arena without carrying along shavings that might distract the tracking system. The arena floor and Plexiglas-box floor are levelled. The arena was thoroughly rinsed with water and soap and then dried, and the home cage was replaced by a clean home cage, at the end of each mouse-session.

Testing protocol and Analysis. The mouse was housed in the replaced home-cage, which included shavings from the original home cage, for a 24 h adjustment period. To increase the likelihood that the mouse's activity was elicited by the exposure to the open space rather than by the diurnal cycle, the 45 h session commenced four hours after the onset of the light cycle at 10:00 AM, when the doorway barrier was gently removed and kept open throughout the 45 h session. The lights were switched on when the mouse was introduced into the home cage and throughout the session. The animals' location was tracked using EthoVision™ (ethovision xt) and smoothed, segmented and partly analyzed using SEE, (http://www.tau.ac.il/_ilan99/see/help). Further analysis was done using Mathematica™.

Results

Figure 2:
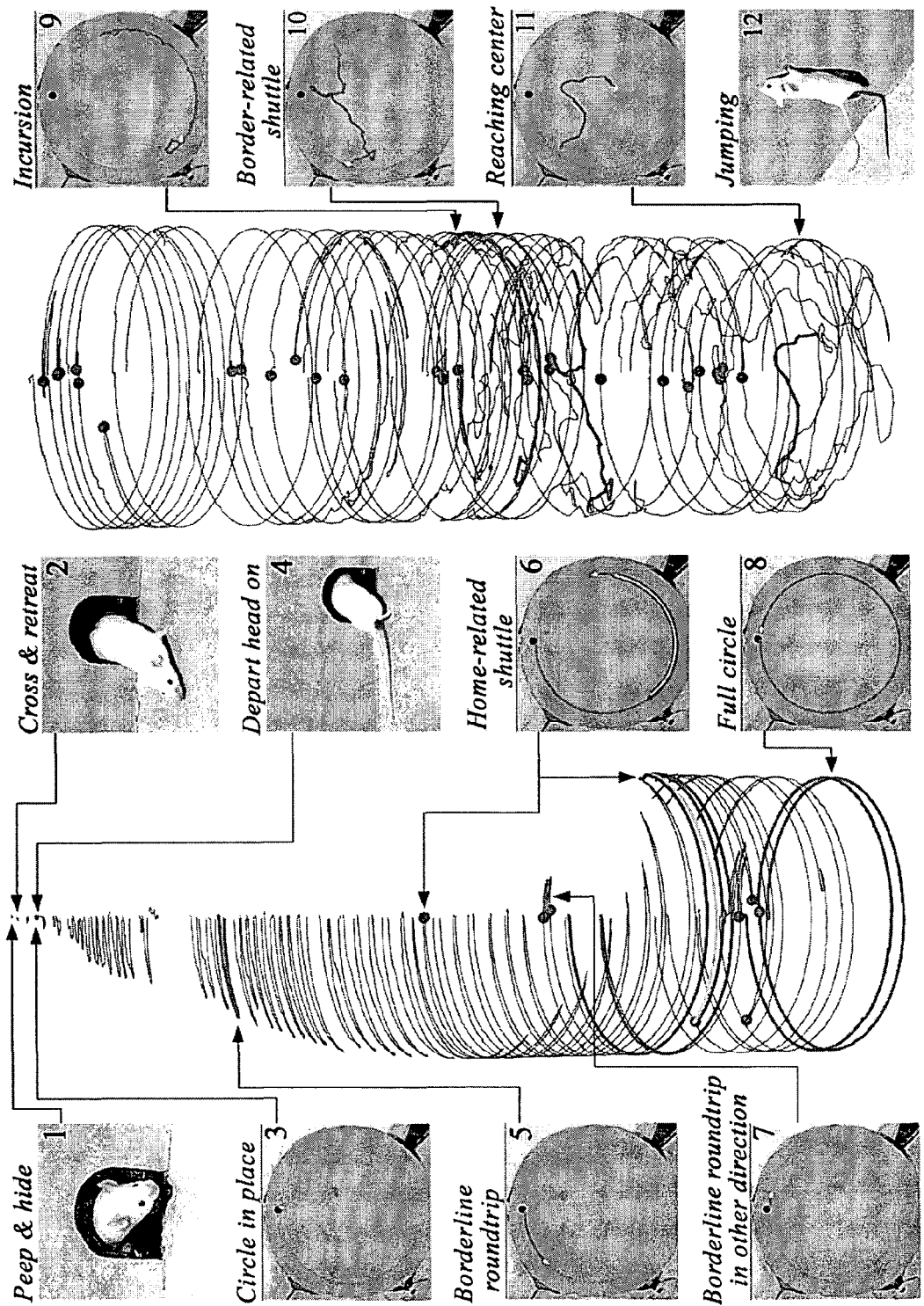
FIG. 2 shows analysis of the movement of a BALB/c mouse in the circular arena as captured by a video camera viewing the arena.

FIG. 2 shows analysis of the movement of a BALB/c mouse in the circular arena 2 as captured by the video camera 12 viewing the arena from above during an observation period of 3 hours. The first occurrence of each of the above 12 motions is indicated. The spiral proceeding from top to bottom, first in the left and then in the right column, presents the time-series of 2D locations on the path traced by the mouse. The enumerated figure-inserts show the landmarks of each of the 12 motions, as indicated by the traces in the arena, and on the spiral. Dots indicate instances in which the mouse approached the cage doorway and did not enter the cage (cage-skips). Absence of a dot indicates departure into the cage. The gray path indicates the return portion within a home-related shuttle.

Figures 3A, 3B:
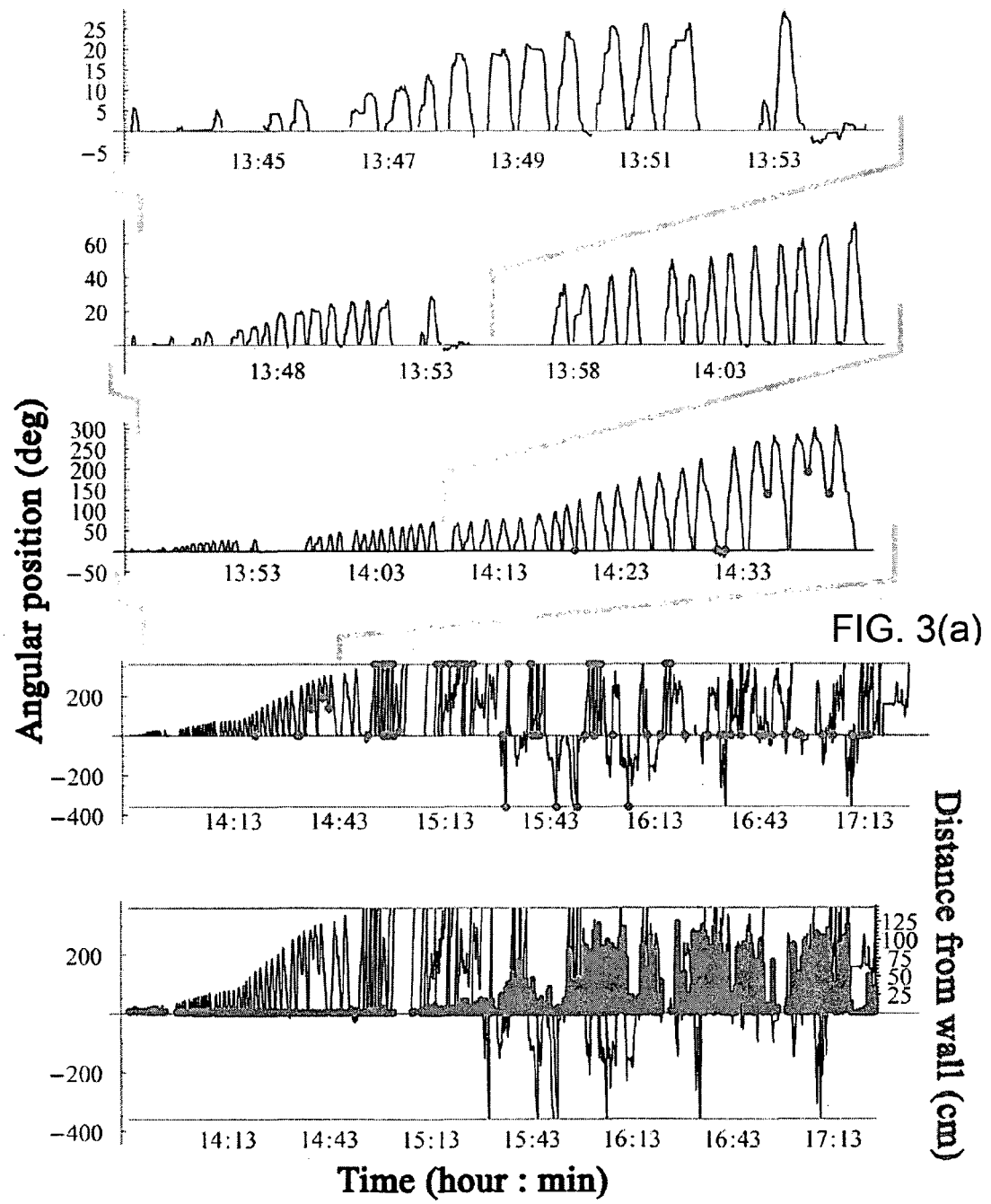
FIG. 3 shows a time series of angular positions data, $\Theta$, of a BALB/c mouse in the arena.

FIG. 3 shows a time series of angular positions data, $\Theta$, of a BALB/c mouse in the arena. (Note the change of time scale from FIG. 3a through FIG. 3d.) The parameter $\Theta$ is a parameter indicative of an extent of the motion SimpleBorderlineRoundTrip, thereby measuring one aspect of its freedom of motion. FIG. 3a shows borderline movements and the dots indicate the times of cage skips. Positive and negative values of $\Theta$ correspond to right- and left borderline direction, respectively, relative to the doorway 3. The SimpleBorderlineRoundTrips started with positive $\Theta$ and therefore the sequence of BorderlineRoundTtripInOtherDirection includes SimpleBorderlineRoundTrips with negative $\Theta$. The horizontal lines designate angular positions of 360° and −360°, both corresponding to the home-cage location. Segments of the graph extending from the x-axis to either one of the horizontal lines represent movement in a complete circle. In order to present the early roundtrips on a visible scale and yet encompass the whole time-series, each of the graphs in FIG. 3a starts with the first roundtrip in the session, progressively incorporating later roundtrips. FIG. 3b shows emergence and build-up of radial movement away from the wall. From first entry on, for an hour and a half, the mouse moved exclusively along the border within a single dimension. Only then was radial movement gradually exhibited by the subject.

For example clock time can be transformed into the ordinal number of each episode of the repeated motion The dependence on the transformed time can be determined in a number of ways. For example, in the case of roundtrips, as shown in FIG. 3, the measure may be the number of roundtrips executed until $\Theta$ reaches 180°. For the session shown in FIG. 3, 46 roundtrips were executed before $\Theta$ reached 180°.

As another example for transforming clock time into scaled time, the transformed time may be the clock time measured only while the animal conducts roundtrips. (The clock is stopped when the subject is not engaged in roundtrips, for example, when the subject is in the home cage.) TimeInRoundtrips, which is the clock time For this transformation, the time dependence of the motion may be the time from first excursion until $\Theta$ reaches 180°, which for the session shown in FIG. 3 is 41.5 minutes.

Using TimeInRoundtrips as the transformed time scale, the time dependence can also be measured by the average rate of increase in $\Theta$, as calculated by the angular distance between 30° and 330°, divided by the duration in TimeInRoundtrips it took the mouse to cross this angular distance. For the session shown in FIG. 3, the value of this parameter was 5.6°/min.

Yet another way to compute a measure of time dependency is by calculating the rate of change of a at a single location such as when the subject is located at $\Theta=180°$. This can be measured for example, by fitting a local polynomial to $\Theta$ as a function of TimeInExcursion in the transformed time scale over a range of values around 180°, and extracting slope at 180°. For the session shown in FIG. 3, the e value of this "speed of exploration" is 10.05°/min.

In an embodiment of the invention, the process the CPU is further configured to determine in a video sequence the order in which two or more predetermined behavioral events are exhibited by a subject. The CPU may further compare a sequence of behavior events exhibited by a subject with a predetermined standard sequence of events. The comparison may involve both the order in which the behavior events were observed in the subject, in comparison to the standard sequence, the duration of one or more of the complex behavior events or the duration between consecutive behavior events. The results of the behavior event sequence analysis can be stored in the memory 20, or displayed on the CRT 19.

The inventors have found that the above sequence of 12 behavior events can be used as a standard reference scale for measuring the developmental dynamics of pathological exploratory behavior of the subject.

FIG. 4 shows the order that each of 12 BALB/c mice subjects performed the 12 above mentioned landmarks listed above. While most of the subjects performed the behavior events in the standard order given above, as determined on a large population of subjects, several of the subjects performed the behavior events in an order that deviated from the standard order. For example, subject BALB42 performed behavior event 7 (BorderlineRoundTtripInOtherDirection) before behavior event 6 (HomeRelatedShuttle), and subject BALB22 performed behavior 6 (HomeRelatedShuttle) before behaviors 4 (DepartHeadOn) and 5 (SimpleBorderlineRoundTrip).

Figure 6:
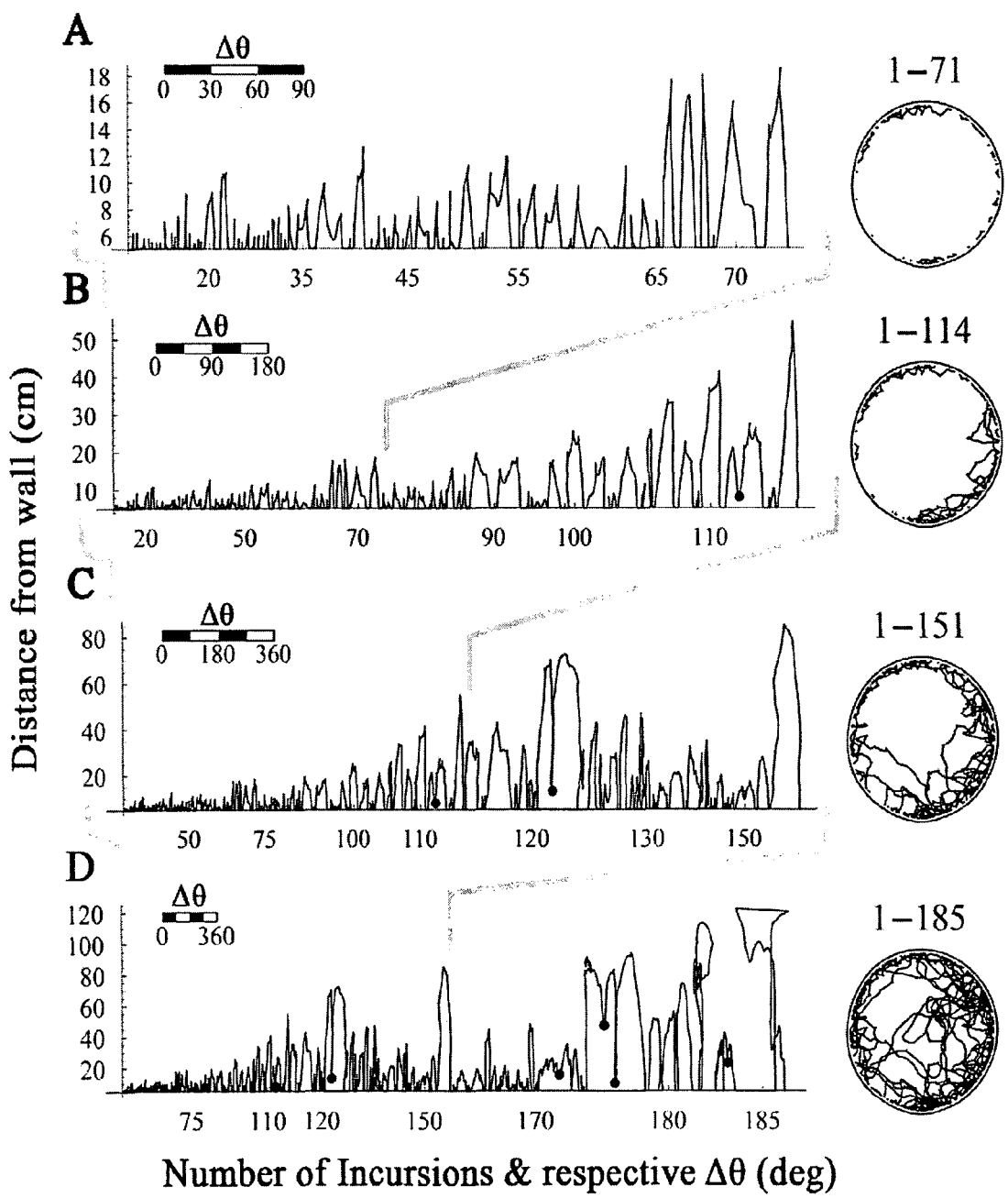
FIG. 6 shows the build-up of incursions exhibited by a BALB/c mouse.

Joints Scale:

The developmental gradient along this scale also involves a progressive addition of degrees of freedom becoming available to the animal. This gradient, unfolding during the transition from immobility to extensive mobility, has been described previously (Golani et al., 1979; Golani et al., 1981; Eilam and Golani, 1988; Golani, 1992; Yaniv and Golani,). It may be used in the invention as a standard scale for measuring the freedom of movements at the joints scale. Within this mobility gradient, a subject first exercises a single degree of freedom by pivoting in place and tracing a circle around itself, then it adds a second degree of freedom by moving forwards and backwards along its own longitudinal axis, and finally it adds a vertical degree of freedom by rearing. The parts of the body are recruited in a cephalo-caudal order along each of these dimensions separately (FIG. 6). This gradient has served as a key for understanding seemingly unrelated phenomena like psychoactive drug-induced behavior (Szechtman et al., 1985) and social status during interaction (Yaniv and Golani, 1987). In these contexts the subjects occupy specific positions on the freedom-of-movement scale. Weight and front: Tracking systems that record trunk orientation (Noldus Ethovision XT; Valente et al., 2008, Branson et al., 2009) enable one to analyze not only in which direction the animal moved, but also the orientation and changes of orientation of the animal's longitudinal body axis (rotation of Front). For example, an animal can trace identical paths between the same two points while walking forwards, backwards, sideway, or any combination of these. Some embodiments can measure the dimensionality of sequences of repeated motion involving transition from Immobility (zero spatial dimension), through whole-body rotation (One spatial dimension) to forward progression (Two spatial dimension) (Eilam and Golani, 1988) and back (Szectman et al., 1985). The metric of the scale is a freedom-of-movement metric. The gradient specifies the animal's current freedom of movement in terms of the number of degrees of freedom it exercises, the freedom within degrees of freedom (for example, amplitude of borderline roundtrips and frequency of shuttles), the developmental landmark reached, and the quantitative amount of build up attained. The dynamically measured freedom of movement reflects the developmental dynamics of the animal's emotional and cognitive state.

Measuring Simultaneously 3 Scales:

Each of the 3 scale—path, joints, and whiskers (or, in a visually guided organism, eyes)—highlights different aspects involved in exploration. The path scale discloses the mouse's strategy of occupancy of the novel environment. For example, first moving along the wall and then adding movement into the center. The joints scale provides a finer resolution of stress-related behavior. For example, tracing a path in a novel part of the arena is often associated with transition from walking on toes (implying familiarity) to walking on whole feet (implying novelty). This scale details also the form and direction of head scans, highlighting the objects of visual attention, as well as the mouse's intentions. For example, a head scan from a particular location in the periphery toward the center often forecasts an incursion into the center from that location in the next visit. The active sensing, third scale, is that of, for example, whisker movements. Rodents control the movements of their whiskers—specialized sensory hair located on their snout—to actively derive tactile information from the immediate environment. By using their whiskers they discriminate textures, localize objects, judge distances, discriminate widths of apertures, and discriminate surface orientations (Szwed et al., 2003; Knutsen et al., 2006; Mitchinson et al., 2007; Anjum et al., 2006).

Each of these scales can be used by itself. However, better resolution can be achieved if two of the above and even all three are combined. For example, whiskers posture may forecast the movements and the path the animal is going to take: retraction of the whiskers on, say, the right side of the head forecasts head turning and then whole-body turning to the right. Because emotional state, active sensing, attention, intention, and performance all have a reciprocal influence on each other, combined quantification of the gradient on the 3 scales simultaneously, should offer even better resolution.

The path scale is particularly useful for highlighting pathologies in arousal management, by quantifying the neophobia-related events that are associated with the management of arousal—the frequency and rate of growth of roundtrips, the frequency, complexity, timing, and location of shuttles, and the frequency and timing of cage skips. Density functions of each and every feature of the roundtrip can be used to articulate and highlight the differences between normal and pathological management of arousal (management of novel input).

The joints scale can include such parameters as angular orientation of mid-sagittal plane of lower torso in reference to an absolute frame, body-related direction of shift of weight of lower torso center, horizontal angular position of upper torso, horizontal angular position of head, stretching forward position of upper torso, stretching forward position of head, vertical angular position of lower torso, vertical angular position of upper torso, vertical angular position of head, distance of FR paw from ground, direction of FR paw movement in body related frame, distance of FL paw from ground, direction of FL paw in body related frame, distance of HR paw from ground, direction of HR paw in body-related frame, distance of HL paw from ground, direction of HL paw in body-related frame, maximal horizontal angular displacement of lower torso per bout following immobility, maximal horizontal angular displacement of upper torso per bout following immobility, maximal horizontal angular displacement of head per bout following immobility, maximal forward displacement of lower torso per bout following immobility, maximal forward displacement of upper torso per bout following immobility, maximal forward displacement of head per bout following immobility, maximal vertical angular displacement of lower torso per bout following immobility, maximal vertical angular displacement of upper torso per bout following immobility, maximal vertical angular displacement of head per bout following immobility The whiskers scale may include at each time point such parameters as:

{{(whisker's identity, Angle in head related coordinates, Whisker Curvature), (Forward-backward, start time, end time, velocity, frequency, contact vs. no contact with object, touch time, release time, location of contact with object on whisker), (vertical, start time, end time, velocity, frequency, contact vs. no contact with object, touch time, release time, location of contact on whisker), for all whiskers measured and time points.

Figure 5:
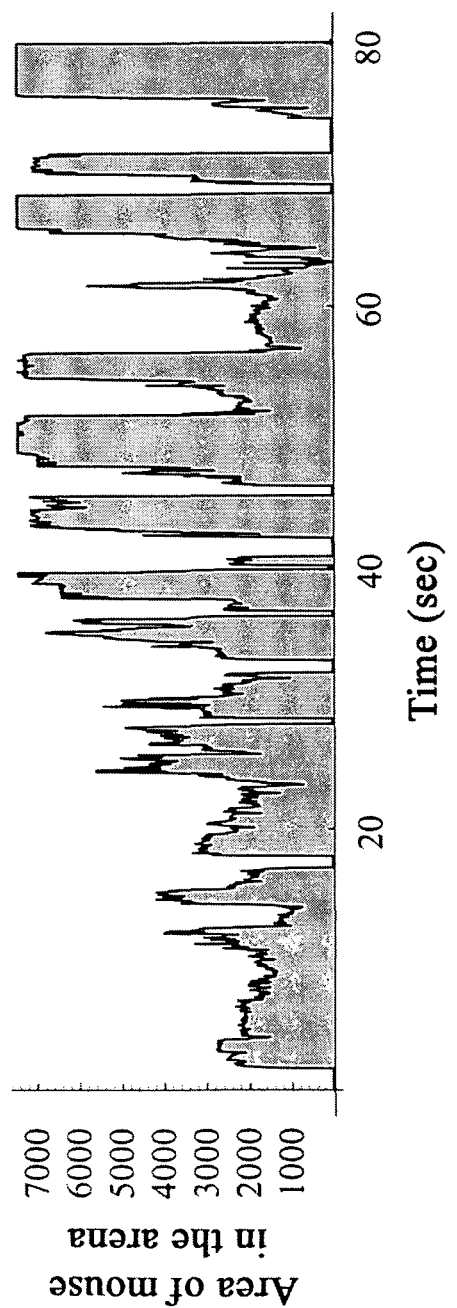
FIG. 5 shows the extent of performing Peeping and hiding by a BALB/c mouse.

FIG. 5 shows the build-up of the peep&hide motion observed in a subject. The extent of Peep&Hide is measured by the area of a mouse (in arbitrary units) penetrating from the home cage through the doorway into the arena over a period of 80 seconds. The area of the mouse is a parameter indicative of the extent of performing peep&hide motion. A gradual build-up in amplitude of the area during Peep&hide eventually leads to the first episode of Cross&Retreat, and then to the first episode of CirclingInPlace near the doorway.

FIG. 6 shows the build-up of incursions exhibited during a BALB/c mouse-session in the arena on a transformed time scale that was obtained as follows. Each incursion has an associated angular section $\Delta\theta$, where $\Delta\theta$ is the change in angular position of the subject during the incursion. The transformed time t' is then obtained as the sum of the $\Delta\theta$ for all incursions starting before clock time t. Incursions are plotted in FIG. 6 in this transformed time scale juxtaposed in the order of their performance, from the first incursion to the incursion that reached the centre. Dots show the times of BorderRelatedShuttles in this transformed time scale. The actual paths traced by the subject during the time period of each of the graphs 6A to 6D is shown to the right of the graph. The first simple incursions are short and linear, starting and ending at the same location along the wall (small $\Delta\theta$). The build up within incursions includes both an increase in maximal distance from wall, $\rho$max values, and an increase in $\Delta\theta$. The increase in $\Delta\theta$ leads to the option of not to returning all the way to the wall. This is reflected in the emergence and subsequent proliferation of border-related shuttles (dots in the graphs of FIG. 6), turning simple incursions into complex incursions, and simple roundtrips into complex roundtrips including one to several BorderRelatedShuttles. The invasion of the third, vertical, dimension emerges much later (see FIG. 2).

FIG. 7 shows the type of plot shown in FIG. 6 for each of the 12 BALB/c mice whose behaviour is shown in FIG. 4. Note the non-monotonic build up in the extent of the incursions (both the distance from the arena border and the $\Delta\theta$) in all of the 12 mice.

Figure 8:
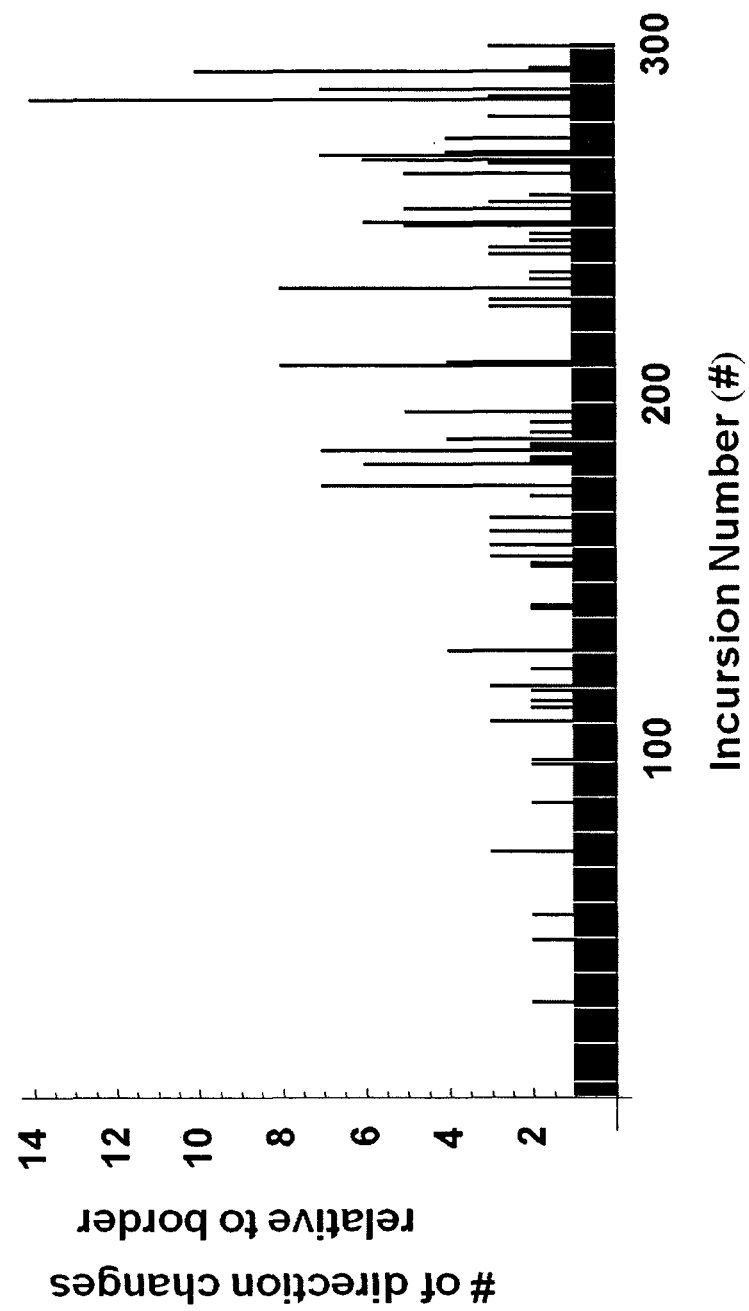
FIG. 8 shows the frequency of changes of direction relative to the border per incursion in a BALB/c moue.

FIG. 8 shows the number of BorderRelatedShuttles per incursion as a function of the ordinal number of the incursion, which serves as a transformed time scale of a single mouse. The number of BorderRelated Shuttles increased with increasing incursion number at a rate of about 2 BorderRelatedShuttles per 100 incursions. In this way incursions become progressively more tortuous.

FIG. 9 shows path plots of the developmental sequence and build up of the staying-in-place (one dimension), and borderline (two dimension) stages in C57BL/6 mice tested in a walled free setup. Each mouse-session is represented by a horizontal sequence of circles, from left to right. Each circle presents all roundtrips performed by the indicated ordinal number of the incursion next to each circle. From the first entry (shown in thin lines in FIG. 9) until the current roundtrip (shown in Thick lines in FIG. 9) For the sake of clarity presented are only i) the roundtrips that brought about a significant build up of the path, ii) the first full-circle roundtrip along the circumference, and iii) the last roundtrip in the session. Note the increasing maximal distance from doorway during progressive roundtrips, the primacy of borderline movement over radial movement (all mice), the exhaustion of the circumference before the onset of radial movement (mice B and E), the overlap between borderline and radial movements in quite a few mice (all mice except B and E), and the separate build up of movements in the zero, one, and two dimensions.

FIG. 10 shows the exhaustion of the radial (two) dimensional movement before the onset of Jumps on the wall (three dimensional) in free C57BL/6 mice. Each circle presents the path traced by the mouse up to the point in time when the mouse performed its first jump in the session. The trajectory of the jump is identified by the trajectory crossing the smooth border (enlarged in the respective inserts).

The invention claimed is:

1. A system for analyzing exploratory behavior of one or more subjects comprising:
    (a) a tracking device configured to track motion of the subject and to generate a signal indicative of the subject's motion; and
    (b) a CPU configured to
        (i) identify in the signal one or more sequences of repeated motions, or one or more sequences of sequences of repeated motion, wherein a motion is a time dependent change of a variable of one or more of the subjects starting from a reference value and terminating with the same reference value;
        (ii) for each of the one or more sequences of identified repeated motions:
            (a) determine for each occurrence of the repeated motion one or both of a clock time t at which the occurrence occurred or a clock time interval during which the occurrence occurred;
            (b) calculate for each occurrence of the repeated motion a value of one or more predetermined parameters each parameter value being indicative of a single occurrence of the motion; and
            (c) calculate a time dependence of the one or more predetermined parameters during the sequence of repeated motion or the sequence of sequences of repeated motion.

2. The system according to claim 1 wherein the CPU is further configured to transform the clock time scale t to a transformed time scale t' and the step of calculating a time dependence is performed using the transformed timescale t'.

3. The system according to claim 2 wherein t' is calculated in an algorithm involving t and at least one of the calculated parameter values.

4. The system according to claim 2 wherein the time transformation is an ordinal number of each motion in the sequence of repeated motions.

5. The system according to claim 1 wherein one or more of the parameters are selected from the group:
    (a) a duration of the motion;
    (b) position;
    (c) velocity;
    (d) acceleration;
    (e) extent; and
    (f) curvature.

6. The system according to claim 1 wherein the CPU is further configured, for each of one or more sequences of repeated motions, to calculate values of one or more derived parameters in a calculation involving the values of the one or more of the predetermined parameters.

7. The system according to claim 1 wherein the time transformation is cumulated time spent by a subject performing a predetermined motion in a sequence of repeated motions.

8. The system according to claim 1 wherein, in a sequence of sequences of repeated motion, the time transformation is the clock time of the first performance of each motion in each of the sequences of repeated motion.

9. The system according to claim 1 further comprising an arena.

10. The system according to claim 9 further comprising an enclosure attached to the arena configured to contain the subject and further configured to allow passage of the subject between the arena and the enclosure.

11. The system according to claim 1 wherein one or more of the repeated motions are selected from: Peep&Hide, Cross&Retreat, CircleInPlace, DepartHeadOn, SimpleBorderlineRoundTrip, HomeRelatedShuttle, BorderlineRoundTtripInOtherDirection, FullCircle, SimpleIncursion, WallRelatedShuttle, ReachingTheCenter, and Jumping.

12. The system according to claim 1 wherein the CPU is further configured to determine a dimensionality of the subjects motion.

13. The system according to claim 12 wherein the CPU is further configured, for an identified dimensionality, to determine a degree of freedom within the identified dimensionality by measuring a number of types of repeated motions performed by the subject relative to a number of predetermined types of motion available to the subject within the identified dimensionality.

14. The system according to claim 1 wherein the CPU is configured to track the subject's movement at a joints scale.

15. The system according to claim 14 wherein the CPU is further configured to identify one or more sequences of repeated motions, the motions being selected from:
(a) horizontal head movements;
(b) horizontal chest and head movements;
(c) horizontal pelvis, chest, and head movements;
(d) forward head movements;
(e) forward chest and head movements;
(f) forward pelvis, chest, and head movements;
(g) forward progression;
(h) vertical head movements;
(i) vertical chest and head movements; and
(j) vertical pelvis, chest, and head movements.

16. A method for analyzing exploratory behavior of one or more subjects comprising:
(a) tracking motion of the subject;
(b) identifying one or more sequences of repeated motions performed by the subject, or one or more sequences of sequences of repeated motion performed by the subject;
(c) for each of the one or more sequences of identified repeated motions:
(i) determining for each occurrence of the repeated motion one or both of a clock time t at which the occurrence occurred or a clock time interval during which the occurrence occurred, wherein a motion is a time dependent change of a variable of one or more of the subjects starting from a reference value and terminating with the same reference value;
(ii) calculating for each occurrence of the repeated motion a value of one or more predetermined parameters of the occurrence of the motion, each parameter value being indicative of a single occurrence of the motion; and
(iii) calculating a time dependence of the one or more predetermined parameters during the sequence of repeated motion or the sequence of sequences of repeated motion.

17. The method according to claim 16 further comprising transforming the clock time scale t to a transformed time scale t' and calculating a time dependence using the transformed timescale t'.

18. The method according to claim 17 wherein t' is calculated in an algorithm involving t and at least one of the calculated parameter values.

19. The method according to claim 17 further comprising, for each of one or more sequences of repeated motions, calculating values of one or more derived parameters in a calculation involving the values of the one or more of the predetermined parameters.

20. The method according to claim 17 wherein the time transformation is an ordinal number of each motion in the sequence of repeated motions.

21. The method according to claim 17 wherein the time transformation is cumulated time spent by a subject performing a predetermined motion in a sequence of repeated motions.

22. The method according to claim 17, wherein in a sequence of sequences of repeated motion, the time transformation is the clock time of the first performance of each motion in each of the sequences of repeated motion.

23. The method according to claim 22 further comprising providing an enclosure attached to the arena configured to contain the subject and further configured to allow passage of the subject between the arena and the enclosure.

24. The method according to claim 16 wherein one or more of the parameters are selected from the group:
(a) a duration of the motion;
(b) position;
(c) velocity;
(d) acceleration;
(e) extent; and
(f) curvature.

25. The method according to claim 16 wherein the subject's motion is confined to an arena.

26. The method according to claim 16 wherein one or more of the repeated motions are selected from: Peep&Hide, Cross&Retreat, CircleInPlace, DepartHeadOn, SimpleBorderlineRoundTrip, HomeRelatedShuttle, BorderlineRoundTtripInOtherDirection, FullCircle, SimpleIncursion, WallRelatedShuttle, ReachingTheCenter, and Jumping.

27. The method according to claim 16 further comprising determining a dimensionality of the subject's motion.

28. The method according to claim 27 further comprising, for an identified dimensionality, determining a degree of freedom within the identified dimensionality by measuring a number of types of repeated motions performed by the subject relative to a number of predetermined types of motion available to the subject within the identified dimensionality.

29. The method according to claim 16 further comprising tracking the subject's movement at a joints scale.

30. The method according to claim 16 wherein further comprising identifying one or more sequences of repeated motions, the motions being selected from:
(a) horizontal head movements;
(b) horizontal chest and head movements;
(c) horizontal pelvis, chest, and head movements;
(d) forward head movements;
(e) forward chest and head movements;
(f) forward pelvis, chest, and head movements;
(g) forward progression;
(h) vertical head movements;
(i) vertical chest and head movements; and
(j) vertical pelvis, chest, and head movements.

* * * * *